(12) United States Patent
Creswell et al.

(10) Patent No.: US 6,564,264 B1
(45) Date of Patent: May 13, 2003

(54) SYSTEM, APPARATUS AND METHOD FOR AUTOMATIC ADDRESS UPDATING OF OUTGOING AND INCOMING USER MESSAGES IN A COMMUNICATIONS NETWORK

(75) Inventors: Carroll W. Creswell, Basking Ridge, NJ (US); Kenneth Mervin Huber, Red Bank, NJ (US); Brian J. Perry, Long Valley, NJ (US); John Gerow Ramage, Westfield, NJ (US); Ronald Sherman, Livingston, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/456,318

(22) Filed: Dec. 8, 1999

(51) Int. Cl.[7] .............................................. G06F 15/16

(52) U.S. Cl. ..................... 709/245; 709/246; 709/206

(58) Field of Search ............................... 709/206, 245, 709/246, 3, 93.01, 93.24

(56) References Cited

U.S. PATENT DOCUMENTS

| | | | | |
|---|---|---|---|---|
| 5,717,863 A | * | 2/1998 | Adamson et al. | 709/24 |
| 5,751,960 A | * | 5/1998 | Matsunaga | 379/93.24 |
| 6,014,711 A | * | 1/2000 | Brown | 709/245 |
| 6,073,141 A | * | 6/2000 | Salazar | 707/10 |
| 6,353,852 B1 | * | 3/2002 | Nestoriak et al. | 379/88.17 |
| 6,377,949 B1 | * | 4/2002 | Gilmour | 704/1 |
| 6,405,243 B1 | * | 6/2002 | Nielson | 709/203 |
| 6,427,164 B1 | * | 7/2002 | Reilly | 709/203 |

* cited by examiner

Primary Examiner—Mehmet B. Geckil

(57) ABSTRACT

A system, apparatus and method automatically update address information of a user's outgoing and incoming messages to/from a communication network thereby relieving the user of the burden of manually entering address changes into a user address book. A plurality of users are coupled through terminals to a server in the communication network for exchanging telephone, CATV, Internet, intranet for messaging, facsimile, etc purposes. The server includes a message store; stored message profile; and is coupled to a change server linked to a network. The change server includes search rules and change options provided by the users in directing the change server in finding correct and alternative address information when erroneous or unknown information is detected in the outgoing and incoming messages. Each user address book includes a series of contacts for each user. Each contact is identified by an identification number, ID, including a name and address. The server detects message headers where a "Send To Address" is not in the address book. The change server is activated and accesses external databases for correct or alternative addresses in accordance with search rules provided by the user. The alternative or correct address books address information is installed in the users address book and the "Send To Message" process is executed. For returned messages incorporating erroneous information, the search server is again activated to access the databases for correct address information, after which the user's address book is updated thereby eliminating the time-consuming, irritating manual process of updating the user address book for outgoing and incoming messages.

13 Claims, 3 Drawing Sheets

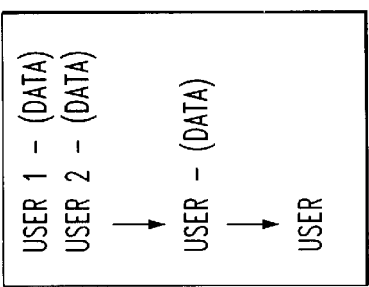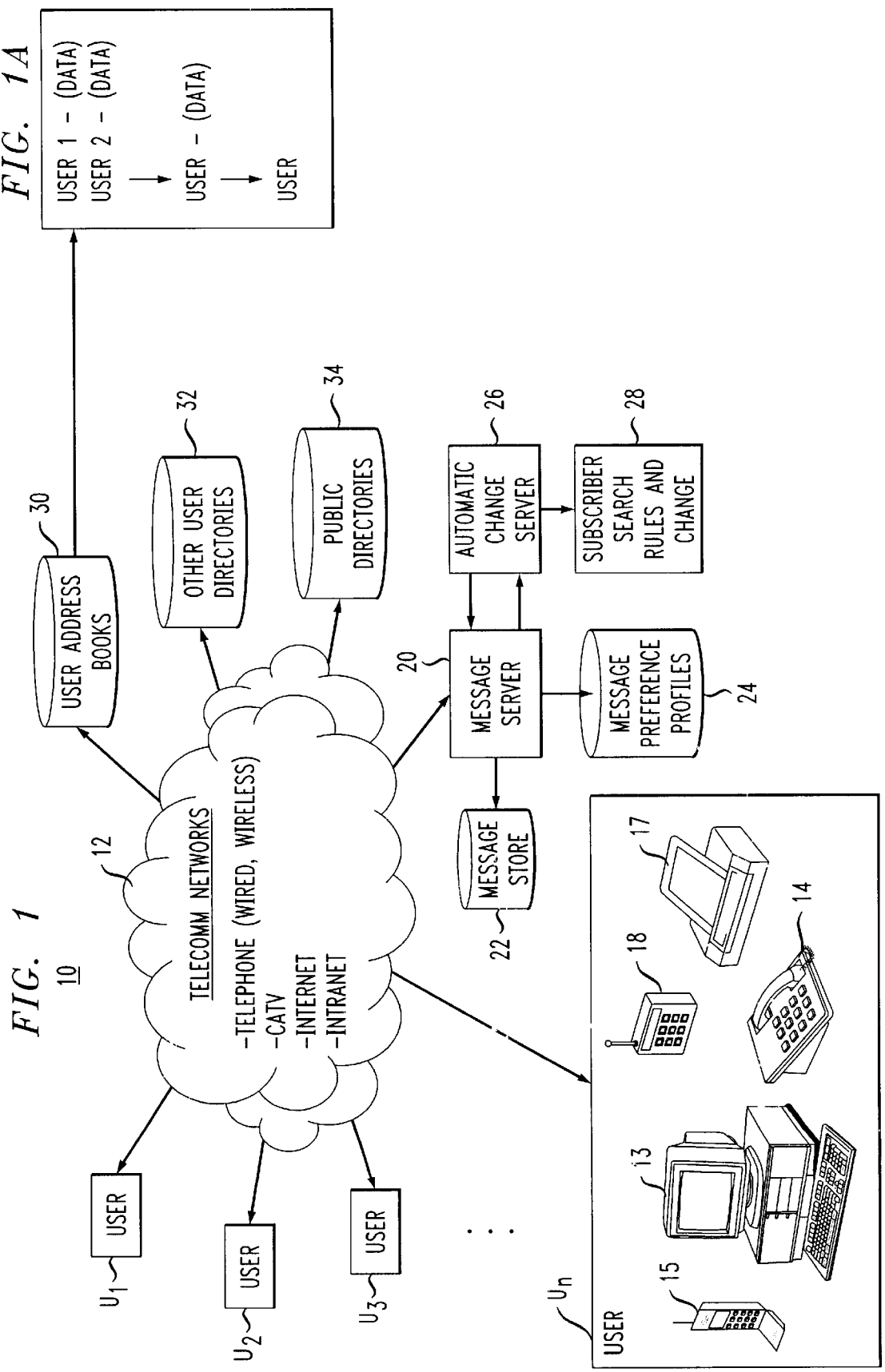

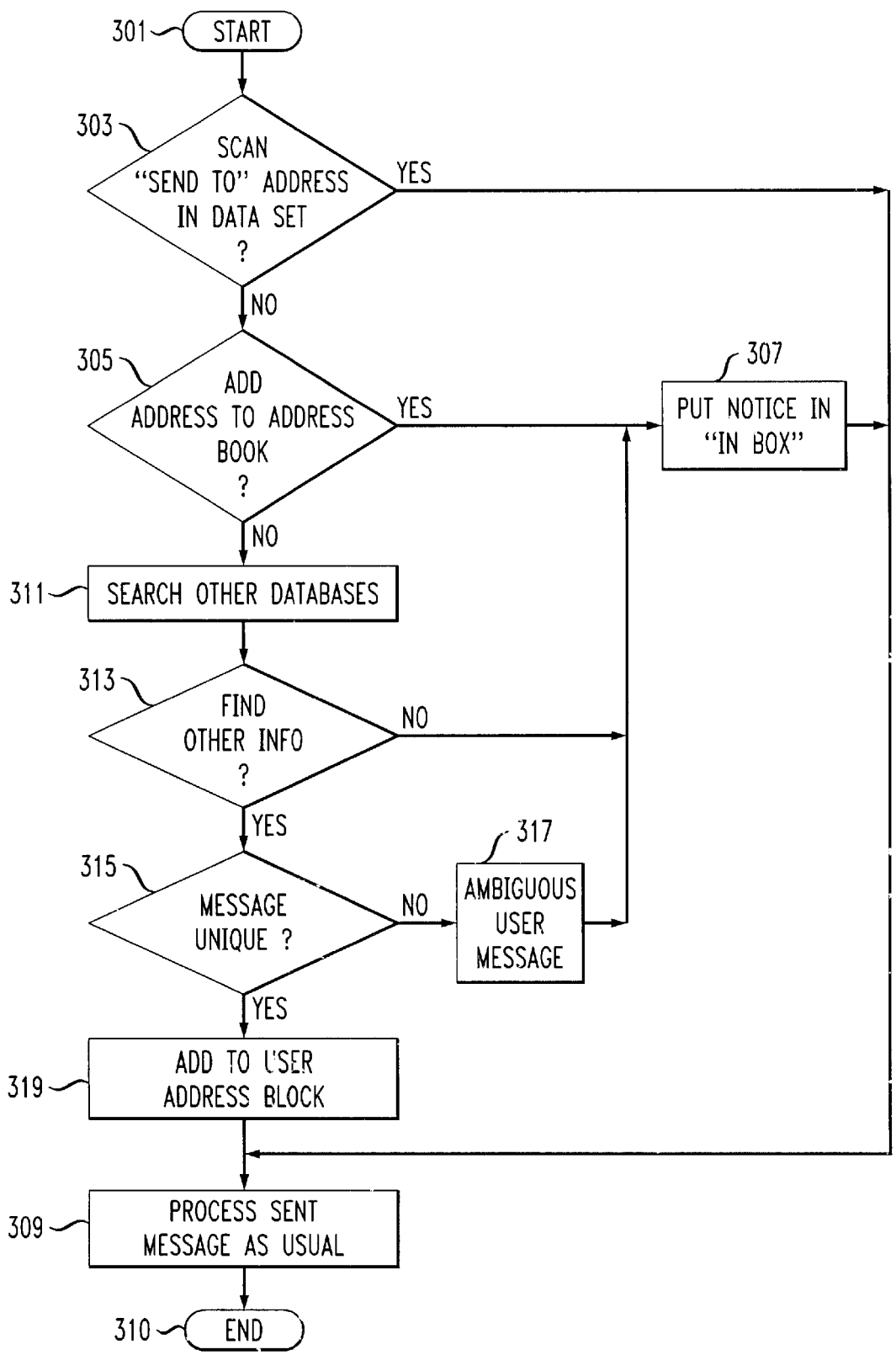

SYSTEM, APPARATUS AND METHOD FOR AUTOMATIC ADDRESS UPDATING OF OUTGOING AND INCOMING USER MESSAGES IN A COMMUNICATIONS NETWORK

BACKGROUND OF THE INVENTION

1. Field of the Invention

This invention relates to electronic messaging systems in a communication network. More particularly, the invention relates to systems, apparatus and methods of operation for automatic address updating of outgoing and incoming user messages in a communication network.

2. Description of Prior Art

In communication networks providing electronic messaging, it is quite common for changes to occur in the identifiers of people, businesses, or groups as collected in lists, address books, rolodexes of user's, and personal information manager's databases. Typically, changes are handled as a manual process when a communication, e.g., fax, voice, e-mail, multimedia is rejected. In such instances, the user must personally and manually go into the various data sets and make appropriate changes. The manual change process is time-consuming, annoying, and seemingly, never ending as most of the changes tend to be out of control of an individual. For example, local telephone companies have been creating new Numbering Plan Areas (NPA) or area codes on a large scale. Similarly, Uniform Resource Locators (URL's) in the Internet are often very volatile. In addition, when a user wishes to add a new person to a data set, for example, after receiving a communication from the person, the user must manually transcribe the telephone number or information from a communication "header" to a database(s). To relieve a user of the burden of manually entering address changes into his or her directories for outgoing and incoming messages, a system, apparatus and method are needed to automatically update such address information and still be compatible with all types of communication networks including telephone systems, the Internet, intranet, CATV, and the like.

Prior art related to updating electronic messaging service in communication networks include the following:

U.S. Pat. No. 5,644,625 entitled "Automatic Routing & Rerouting of Messages to Telephones & Fax Machines Including Receipt of Intercept Voice Messages" to E. L. Solot; issued Jul. 1, 1997 (Solot) discloses an apparatus and method to capture, analyze and store information contained in voice intercept messages and, particularly, those messages containing information regarding changes of telephone numbers and/or Area Codes. Solot provides means to update the telephone number database and complete a call where a new number has been provided in a voice intercept message.

U.S. Pat. No. 5,812,795 entitled "Automatic Addressing of Messages & Message Components of Different Media" to D. A. Horovitz et al., issued Sep. 22, 1998 (Horovitz) discloses a message sender that has or has access to an electronic directory that lists, for at least some recipients, a plurality of different addresses and indicates for each address the message medium or media that can be received at that address. The message sender automatically affects the proper addressing of the message or message component for different media thereby sparing the message sender the effort and pitfalls of having to do so manually.

IBM Technical Disclosure Bulletin (TDB) entitled "Mechanism to Automate Updating Obsolete Telephone Numbers," published Volume 37, No. 04A, April 1994, pages 115–116, discloses a telephone software control mechanism that automates detection and updating of a changed telephone number. The mechanism upon activation (1) detects a telephone number from a recorded message, (2) re-dials the telephone using the new number, (3) updates the appropriate telephone repository, e.g., address book, nickname (with the new number), allows the user to perform these tasks using a conventional telephone and (5) allows the old number temporarily to be saved with the new number.

None of the prior art discloses apparatus and methods for monitoring a user's outgoing and incoming messages to determine if the sender or recipient address is correct, and, if not, automatically locating the correct address by accessing internal directories and/or on-line directories independent of the media in which the message was sent, and updating the user's address information with the correct address of a sender or recipient.

SUMMARY OF THE INVENTION

The system, apparatus and method are achieved in a communication network, e.g., telephone, CATV, Internet, intranet for voice/data/multimedia/fax, and the like, serving a plurality of users through any type of terminal equipment, i.e. telephone, PC, cellular device, etc. The network includes a message server coupled to a message store for incoming/outgoing messages and a database of message preference profiles of users. The message server is coupled to a programmable address change server linked to the network. The programmable change server includes user search rules and change options for accessing internal and external databases to locate correct address information for outgoing and incoming user messages containing erroneous or new address information. The external databases are of various types including, for example, a user address book; other user directories and public directories. The user address book includes a series of contacts for each user. Each contact is identified in a data set by an identification number (ID), name and address. For outbound messages, the message server scans the message header for "Send To" address. If the contact is already in the data set, a "yes" condition sends the message to the usual recipient address. For a "no" condition and based on user search options stored in the change server, the message server interrogates user internal databases at the terminal and external system directories, public directories, to obtain information to populate the contact information for the recipient in the user address book. If new address information is obtained from the searching, the message server generates a notification message which is sent to the user regarding the new address information and inquiring whether the new address information should be added to the user address book database. If the user indicates the new address information is necessary, the user address book is updated and the message sent with the updated address information. For inbound messages, the message server scans each mail item for messages returned for incorrect address. A "yes" condition tests for typographical errors; checks the subscriber user data set to extract other message identifiers (e.g., names, address phone books, etc.) and applies user-definable search rules on other databases and directories to find the correct or alternative address information. A test is determined if the correct or alternative address information is found. A "yes" condition resends and updates the user's address book. A "no" condition checks to determine if the sender is in the user's data set. A "no" condition initiates user's options, either a flag message to the user indicates "Not in database"

or a new entry is automatically created. A "yes" condition processes the message in the "In Box" as usual.

DESCRIPTION OF DRAWING

The invention will be further understood from the following detailed description of a preferred embodiment, taken in conjunction with an appended drawing, in which:

FIG. 1 is a representation of a system and apparatus incorporating the principles of the present invention.

FIG. 1A is a representation of contact data in the user address book of FIG. 1.

FIG. 3 is a flow diagram for processing out-bound messages returned for incorrect address information and automatically correcting the address information using the apparatus and system of FIG. 1.

DETAILED DESCRIPTION OF A PREFERRED EMBODIMENT

Figure 2:
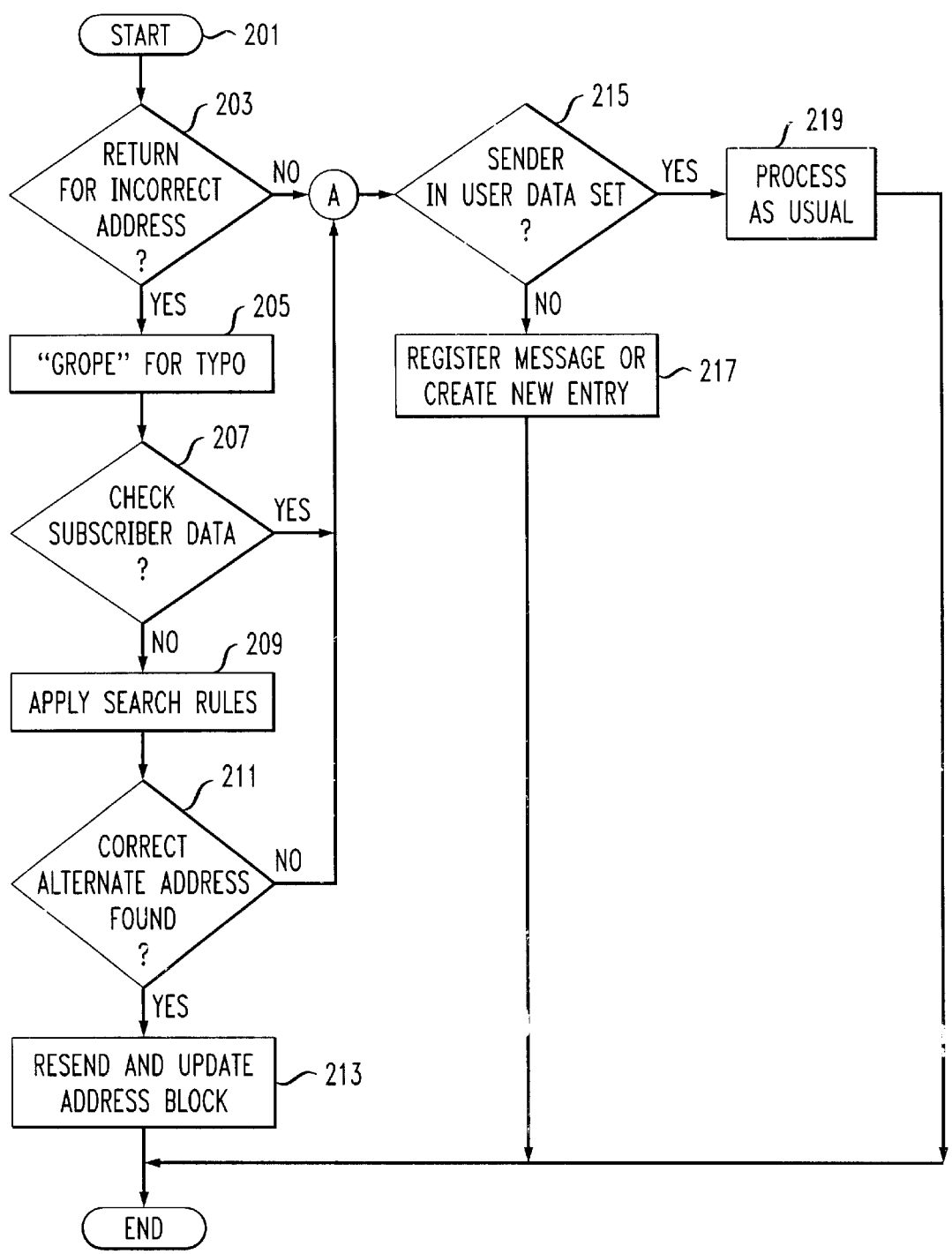
FIG. 2 is a flow diagram for processing in-bound messages for detecting incorrect address information and automatically correcting the address information using the apparatus in the system of FIG. 1.

In FIG. 1, a system and apparatus 10 includes a plurality of users $U_{l1} \ldots U_n$ connected to a communication network 12, e.g., telephone (wire or wireless); CATV; Internet (IP), and intranet handling voice, fax, data, multimedia, and electronic messages exchanged between the Users. Electronic messages may be provided to the network by any terminal device including a PC 13; telephone 14; wireless handset 15; fax machine 17; paging device 18, etc. Electronic messages are transmitted and received from different media in the customary format. A standard server 20 serves as message server and processes the electronic messages exchanged between the users using standard message format and protocols. A message store 22 is coupled to the message server 20 for buffering messages processed by the server 20. Preference Profiles for each of the users are stored in a database 24 coupled to the server 20. The Preference Profiles describe processing details for the various types of messages sent/received by a User. An Automatic Change Server 26 is coupled to both the server 20 and the network 12 for initiating address searching in the network when erroneous address information is detected in electronic messages by the server 20. The automatic change server 26 responds to the message server 20 and includes a database 28 containing user-generated search rules for accessing user address books and public directories to locate correct address information for an electronic message. The correct address information is used to update a user address book contained in a directory 30 coupled to the network. The user may have other databases 32 for access by the automatic change server 26 via network 12 for locating correct address information for an electronic message. In one form, address information is a list of contacts for each user and is stored in directory 30. As shown in FIG. 1A, each contact contains a name, address, and media address(es) for access (when a message is sent) and comparison against (for messages received). Search rules in the automatic change server 26 come into play when the message server 20 detects an erroneous address not listed in the user address book or other directory for incoming or outgoing messages. After accessing the user address books 30, 32 without locating a correct address for the message, the change server 26 accesses on-line public directories 34, e.g., "white pages", "yellow pages", supported by well-known search engines, e.g. YAHOO™, ALTA VISTAS™, etc. on public and private networks to update the contact information in the user address book.

Now turning to FIG. 2, a description will be given for an inbound messaging process 200 using the system and apparatus of FIG. 1, as follows:

The process 200 is started in step 201 when an in-bound message is received by the User. A test 203 is performed to determine if the message was returned for an incorrect address or the incoming address does not appear in the User internal data set. A "no" condition passes the message to entry point A for further processing as will be described hereinafter. A "yes" condition initiates an operation 205 to check for typographical errors in the message for which corrections are made and the message is passed to an operation 207. The subscriber data set in the database 30 are extracted in the operation 207 to obtain alternative identifiers; for example, other names, addresses, phone numbers, etc., as a substitute for the incorrect address or a new address. If an alternative address is located in the database 30, the message is passed to the entry point A. If an address is not located in the database, an operation 209 is performed to activate user search rules in the change server 26 for searching other databases and directories 32, 34, etc., in the network using other identifiers to find correct or alternative network addresses for the returned message or the address which does not appear in the User address book. A test 211 is performed to determine if a correct or alternative or new address is found in the incoming message. A "yes" condition initiates an operation 213 which resends the message with the correct address and updates the user address book for the corrected or new address, as the case may be, after which the process ends. In the case of a "no" condition, for the test 211, the process is returned to the entry point A from which a test 215 is performed to determine whether or not the address is in the user data set. A "no" condition initiates an operation 217 to either flag a message to the user as "not in the database" or automatically create a new entry for the message recipient, after which the process ends. A "yes" condition for the test 215 initiates an operation 219 to process the message with the correct address following the user preference profiles in the database 24. The process ends after the operation 219 and the message server 20 and change server 26 await the next incoming message.

In FIG. 3 a process 300 is shown for processing outbound messages for correct address, information as follows:

The process begins in a start operation 301 after which a test 303 is performed to scan the "Send To" address of out-going messages to determine if the "Send To" address is already in the user's data set. A "yes" condition forwards the "Send To" address which is in the address book to an operation 309 for processing the "Sent Mail" using the User profile preferences in the database 24, after which the process ends in block 310. A "no" condition for the test 303 initiates an operation 305 to request User instructions with respect to adding the "Send To" address to the address book. A "yes" condition initiates a notification message which is placed in the "In Box" of the user by the system in an operation 307. The notification message is processed in the operation 309 as part of the usual processing of "Sent Mail". A "no" condition for the operation 305 initiates a search operation 311 in which the "Send To" address is searched against other internal databases using the search rules in the change server to obtain other information to populate the User's address book for subsequent messages to the addressee. The search information is tested in an operation 313 to determine if the other information is available. A "no" condition returns the process to the operation 307 in which a notification message is placed in the "Sent Mail" for user consideration. A "yes" condition for the test 313 initiates a test 315 to determine if the searched information is unique, i.e., such as new URL's or new Area Codes, or other changes in a recipient's address information. A "no" condition initiates an operation 317 which sends a notification message to activate the operation 307 to place a notification message in the "In Box" of the user. A "yes" condition initiates an operation 319 to add the address to the user's address book by forwarding the address to the user's "Sent Mail" processed in the operation 309.

Summarizing, a system, apparatus and method are described for automatically updating a user's address book for outgoing and incoming messages exchanged between Users in a network. A message server automatically detects outgoing mail for correct addresses or addresses not in the users address book. A change server responds to the message server and initiates database searches in directories accessible in the network to locate correct or alternative or new addresses not in the address book for the outgoing mail. The new or correct alternative addresses are used to update the user's address book. For incoming mail, the header is scanned for messages returned for incorrect address or an address not in the User address book. The change server is initiated and applies search rules to internal and external directories to correct erroneous addresses. The user is notified of an address not listed in the address book for resolution as to adding the new address information to the user address book. The automated management of address information for outgoing and incoming relieves the burden on the user and improves the user's communication efficiency.

The system, apparatus and method have been described in terms of e-mail. However, similar processes may be constructed for processing facsimiles, telephone calls, and multimedia using the concepts disclosed in FIGS. 1, 2 and 3.

While the invention has been shown and described in terms of a specific embodiment, various changes maybe e made without departing from the spirit and scope of the invention as defined in the appended claims, in which:

What is claimed is:

1. A system for automatically updating address information for outgoing messages from a user, and incoming messages to a user, in a communication network, comprising:

network means for exchanging messages including address information between or among the users;

a message server coupled to the network for detecting erroneous or unknown address information in outgoing messages from the user and incoming messages to the user;

search means for providing correct/alternative or new address information in both the outgoing and incoming messages in response to the message server, the search means comprising databases in the network accessible for search purposes to provide the correct/alternative or new address information for both outgoing messages from the user and incoming messages to the user; and a search server coupled to the message server for accessing the databases to correct erroneous or provide new address information.

2. The system of claim 1 further comprising:

means for automatically updating address information in a user address book for outgoing messages and incoming messages in accordance with search results provided by the search server.

3. The system of claim 1 wherein the databases further comprise an internal database containing contact information for comparison with header information in incoming messages and outgoing messages in determining correct or unknown addresses in the header information.

4. The system of claim 1 wherein the databases further comprise public directories for access by the search means to obtain address information for populating a user address book.

5. The system of claim 1 further comprising:

means coupling the message server to the search means; and search rules in the search means for searching the databases to obtain address information in response to the message server detection of erroneous or unknown address information in a message.

6. The system of claim 1 further comprising:

a message store coupled to the message server; and a message profile database for users coupled to the message server.

7. The system of claim 1 wherein the network carries voice and/or data messages.

8. The system of claim 1 wherein the network is a distributed information system.

9. An apparatus for automatic address updating of outgoing user messages to a communication network and incoming user messages from a communication network, comprising:

a terminal for sending and receiving messages, the terminal coupled to the communication network;

a message server coupled to the network for receiving and processing the messages;

message storage device means coupled to the message server for storing the messages;

a database containing user message preference profiles coupled to the server; and a change server responsive to the message server and coupled to the network, the change server including user search rules and change options for searching the network to locate address information for updating a user address database when erroneous or unknown address information contained in a message is detected by the message server; and a user address database coupled to the network for access by the message server.

10. The apparatus of claim 9 wherein the user address database further comprises:

contact information for each user, the contact information including a contact ID, name and address for updating when messages are returned for incorrect address or the contact is not listed in the user address book.

11. The apparatus of claim 9 further comprising:

other user and reference databases coupled to the network for access by the change server in locating address information for the user address database.

12. The apparatus of claim 9 wherein the network carries voice and/or data messages.

13. The apparatus of claim 9 wherein the network is a distributed information system.

* * * * *